US005681086A

United States Patent [19]

Baloche

[11] Patent Number: 5,681,086
[45] Date of Patent: Oct. 28, 1997

[54] ARTICULATION FOR VEHICLE SEAT, AND VEHICLE SEAT EQUIPPED WITH SUCH AN ARTICULATION

[75] Inventor: François Baloche, La Corneille, France

[73] Assignee: Bertrand Faure Equipements SA, France

[21] Appl. No.: 584,296

[22] Filed: Jan. 11, 1996

[30] Foreign Application Priority Data

Jan. 10, 1995 [FR] France ................... 95 00206

[51] Int. Cl.$^6$ .................................................. B60N 2/02
[52] U.S. Cl. ................................. 297/367; 297/354.12
[58] Field of Search ............................... 297/367, 362, 297/468, 363, 361.1, 366, 354.12; 475/175, 176

[56] References Cited

U.S. PATENT DOCUMENTS

| | | |
|---|---|---|
| 4,143,905 | 3/1979 | Hensel et al. |
| 4,431,233 | 2/1984 | Ernst ................................. 297/468 |
| 5,161,856 | 11/1992 | Nishino ............................... 297/367 |
| 5,216,936 | 6/1993 | Baloche. |

FOREIGN PATENT DOCUMENTS

| | | |
|---|---|---|
| 0502774 | 9/1992 | European Pat. Off. |
| 2364784 | 4/1978 | France. |
| 2626154 | 7/1989 | France. |
| 2241884 | 9/1991 | United Kingdom. |

*Primary Examiner*—Milton Nelson, Jr.
*Attorney, Agent, or Firm*—Larson and Taylor

[57] ABSTRACT

An articulation for a vehicle seat, including a fixed flange, a movable flange provided with an internal circular toothing, at least one lock gear capable of cooperating with the toothing of the movable flange, this lock gear being displaceable radially by a cam, the lock gear having two opposite abutment faces which extend parallel to the direction of sliding of the lock gear from the vicinity of the toothing of this lock gear as far as a shoulder oriented in the opposite direction from this toothing. Two counter-abutment faces integral with the fixed flange are arranged facing the abutment faces and their shoulders, and one of the abutment faces penetrates into its counter-abutment face when the movable flange is subjected to a predetermined pivoting torque while the lock gear cooperates with the toothing of the fixed flange.

12 Claims, 2 Drawing Sheets

ARTICULATION FOR VEHICLE SEAT, AND VEHICLE SEAT EQUIPPED WITH SUCH AN ARTICULATION

FIELD OF THE INVENTION

Background of the Invention

The present invention relates to articulations for vehicle seats, and to the vehicle seats which are equipped with such articulations.

Of the articulations which are known, the invention relates more particularly to an articulation which is intended to equip a vehicle seat, in particular a car seat, this seat including a seat part and a backrest which pivots with respect to the seat part, and the articulation having:

- first and second flanges, one of which is intended to be joined to the seat part of the seat, and the other of which is intended to be joined to the backrest of the seat, and these flanges being mounted so as to pivot with respect to one another about an axis of rotation, the second flange being integral with a toothing which extends over at least an arc of a circle centred on the axis of rotation, and which is oriented radially inwards,
- at least one lock gear provided with an external toothing, capable of cooperating with the toothing of the second flange, this lock gear being guided by sliding in a radial direction, by way of a guide integral with the first flange, between, on the one hand, an engagement position in which the lock gear cooperates with the toothing of the second flange in order to block the articulation, and, on the other hand, a withdrawn position in which it does not cooperate with the toothing of the second flange,
- a cam for controlling the sliding of the lock gear, this cam being stressed by elastic means towards a rest position in which it places the lock gear in its engagement position,
- and a control member for displacing the cam from its rest position towards an activation position in which it allows the lock gear to slide towards its withdrawn position.

The articulations of the type in question may have to withstand pivoting torques which are very high, particularly in the event of an accident involving a vehicle whose seats are equipped with such articulations.

For example, in the event of a rear impact on this vehicle, the occupant of a seat tends to be thrown rearwards and thus bears heavily against the backrest of the seat, and this results in a high torque being exerted on the articulation. This torque can reach 200 daN.m, for example (wherein daN.m refers to deca newton-meter, wherein a deca newton-meter= 10 N.m).

Likewise, in the event of a front impact, when the seat is provided with a so-called "seat-mounted" belt which is in mechanical connection with the upper portion of the backrest, a high rotational torque is exerted on the backrest of the seat and on the articulation on account of the occupant of the seat being thrown forwards, which causes a high degree of traction on the seat belt. The torque to which the articulation is subjected can then reach 550 daN.m, for example.

When an articulation of the type mentioned hereinabove is subjected to such high torques, the stresses exerted on the lock gear on account of the cooperation between the external toothing of the lock gear and the internal toothing of the second flange tend to push the lock gear back radially inwards, that is to say against the cam.

Since the contact zone between the cam and the lock gear is essentially punctiform, this substantial stress may succeed in locally deforming the lock gear and/or the cam in such a way that the lock gear can then retreat towards its withdrawn position, thereby permitting a free pivoting of the movable flange, which pivoting presents some danger for the occupant of the seat during an accident.

In order to remedy this shortcoming, the only solution known hitherto has consisted in constructing an articulation which is bigger and heavier than normal, so that it is stronger.

However, this solution is not desirable since it increases both the weight and the cost of the articulation.

SUMMARY OF THE INVENTION

The particular object of the present invention is to overcome these shortcomings.

To this end, according to the invention, an articulation of the type in question is essentially characterized in that the lock gear has two opposite abutment faces which extend from the vicinity of the toothing of this lock gear as far as a shoulder which is arranged opposite the said toothing of the lock gear and is situated near this toothing, at least the abutment faces of the lock gear presenting a high mechanical strength, the guide including two counter-abutment faces which are respectively arranged facing the two abutment faces and their shoulders and which present a mechanical strength which is inferior to the strength of the abutment faces, and in that when the lock gear is in its engagement position, the mutually facing abutment and counter-abutment faces are in mutual contact over a surface area which is sufficiently small to ensure that one of the abutment faces of the lock gear penetrates into the corresponding counter-abutment face of the guide when one of the flanges is subjected to a pivoting torque, around the axis of rotation, which is greater than a predetermined minimum torque.

Thus, when the articulation is subjected to a very high pivoting torque, for example in the event of an accident, the lock gear is blocked in its engagement position by virtue of the penetration of the abutment face of the lock gear into the counter-abutment face of the guide.

After the accident, the articulation generally remains blocked, which thus entails its replacement, that is to say if the vehicle is still usable.

During experimental trials carried out on a particular example of an articulation according to the invention, it was observed that an articulation of this type was able to withstand, in this particular example, a torque greater than 550 daN.m exerted on the movable flange, which is a considerable torque value.

In preferred embodiments of the articulation according to the invention, recourse is additionally made to one or both of the following features:

- the predetermined minimum torque is between 50 daN.m and 200 daN.m:
- the predetermined minimum torque is between 100 daN.m and 200 daN.m;
- the contact surface between each abutment face and the corresponding counter-abutment face is designed so that when the axle of the flanges is subjected to a torque at least equal to the predetermined minimum torque while the lock gear is in its engagement position, one of the abutment faces of this lock gear penetrates into the corresponding counter-abutment face by a depth which is at least equal to 0.2 millimeters;

the depth of penetration of the abutment face into the counter-abutment face is between 0.3 and 0.5 millimeters;

the lock gear continues in the direction of the cam via a guide body which slides in the guide with a play which is sufficient to ensure that there is no interference with the abovementioned penetration of one of the abutment faces of the lock gear into the corresponding counter-abutment face.

The invention also relates to a vehicle seat which includes a seat part and a backrest which is mounted so as to pivot with respect to the seat part by way of at least one articulation such as is defined hereinabove, it also being possible for this seat to include a seat belt which is in mechanical connection with the backrest at a site of this backrest remote from the seat part.

BRIEF DESCRIPTION OF THE DRAWINGS

Other characteristics and advantages of the invention will be evident from the following detailed description of two of its embodiments which are given by way of non-limiting examples, with reference being made to the attached drawings, in which.

DETAILED DESCRIPTION OF THE PREFERRED EMBODIMENTS

In the various figures, the same reference labels designate identical or similar elements.

Figure 1:
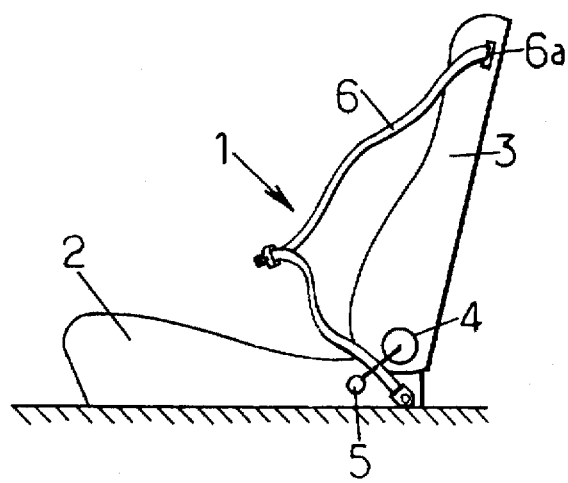
FIG. 1 is a schematic view of a car seat equipped with an articulation according to the invention.

FIG. 1 represents a vehicle seat 1, in particular a car seat, which includes a seat part 2 and a backrest 3 which is mounted so as to pivot on the seat part 2 by means of an articulation 4.

When someone using the seat i wishes to adjust the inclination of the backrest 3, he activates an operating lever 5 or another control member in order to unlock the articulation 4, then proceeds to adjust to the desired inclination by acting directly on the backrest 3, after which he releases the operating lever 5, which once again locks the articulation 4.

The seat can include, if appropriate, a similar articulation 4 on each of its sides, the two articulations then preferably being controlled by the same operating lever 5.

If appropriate, the seat 1 can also include a so-called "seat-mounted" seat belt 6 which is in mechanical connection with the upper portion of the backrest 3 of the seat. This mechanical connection generally consists of a sliding installation of the belt 6 in an opening 6a formed on one side of the backrest 3, the belt 6 continuing beyond this opening 6a inside the backrest 3 as far as a reel device (not represented).

Figure 2:
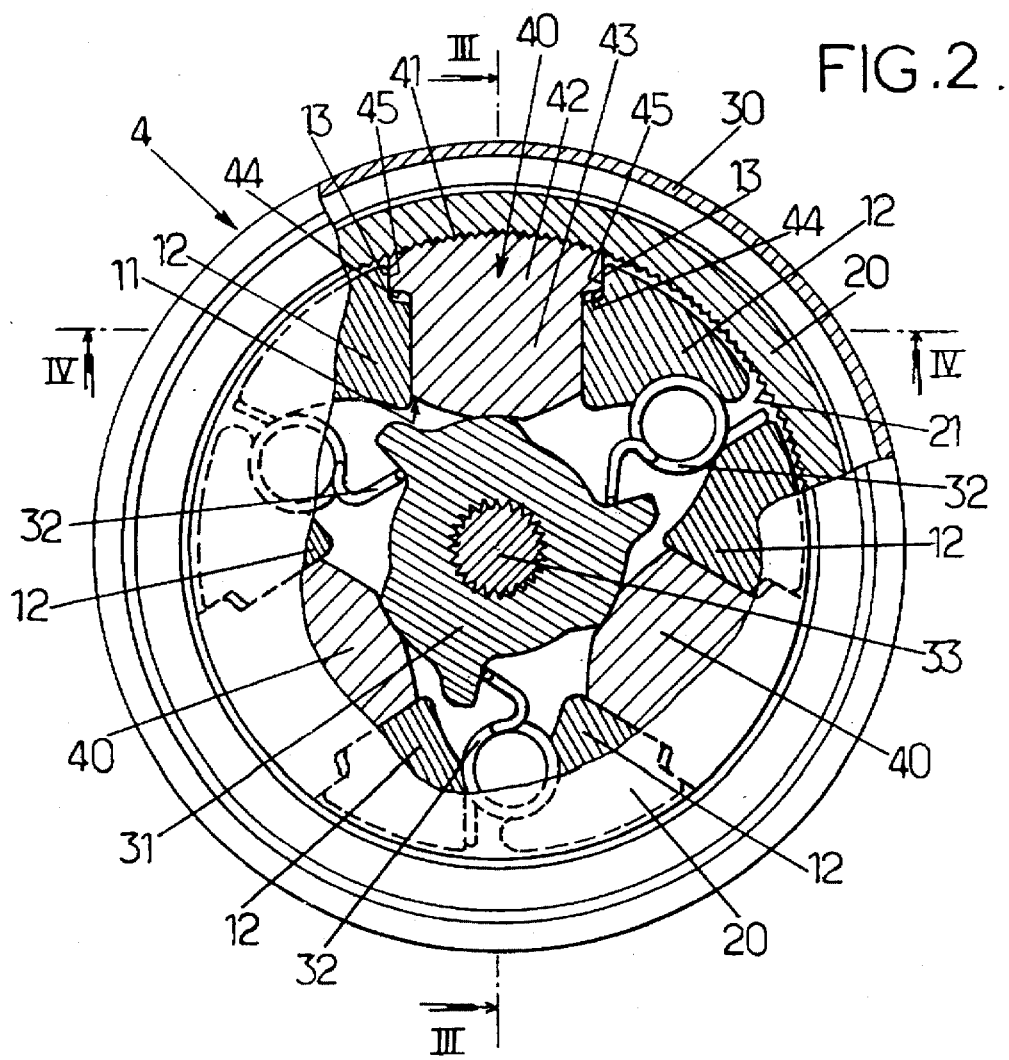
FIG. 2 is a partial cross-section of the articulation with which the seat in FIG. 1 is equipped.
Figure 3:
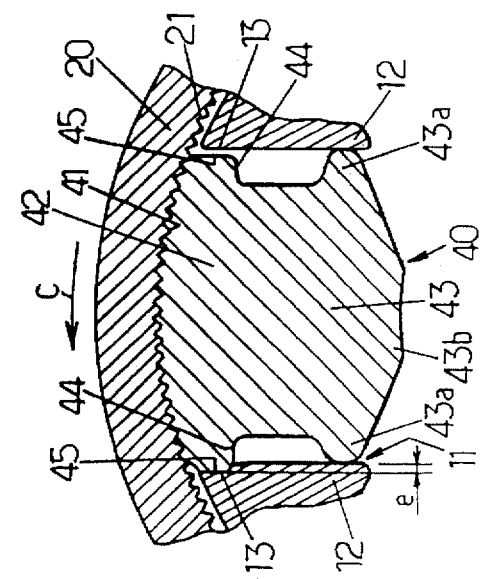
FIGS. 3 and 4 are cross-sections of the articulation in FIG. 2, the sections being taken respectively along the lines III—III and IV—IV in FIG. 2.
Figure 4:
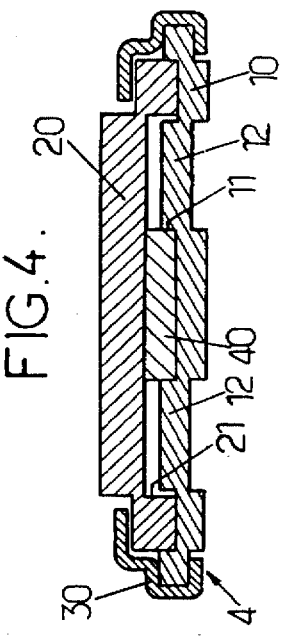

The articulation 4 is represented in greater detail in FIGS. 2 to 4.

This articulation comprises, in a manner known per se:

a metal flange 10 called the fixed flange, which is integral with the framework of the seat part 2 of the seat, a metal flange 20 called the movable flange, which is integral with the framework of the backrest 3 of the seat and which pivots about the axis of rotation X of this backrest, the fixed and movable flanges together forming a round casing, and the movable flange 2 having a circular toothing 21 which is oriented radially inwards and is arranged inside the casing, a sheet-metal ring 30 which is crimped on the circumference of the fixed flange 10 and which partially covers the movable flange 20 in order to close the casing and hold the two flanges against one another, three metal lock gears 40, each provided with an external toothing 41 capable of cooperating with the internal toothing 21 of the movable flange 20, these three lock gears being guided with radial sliding in guide channels 11 formed between bosses 12 which belong to the fixed flange and which project towards the inside of the casing, a metal cam 31 rotating about the axis X and acting on the three lock gears 40, this cam 31 being displaceable angularly between, on the one hand, a rest position in which it pushes the lock gears back towards an engagement position in which the external teeth 41 of these lock gears cooperate with the internal toothing 21 of the movable flange in order to immobilize the movable flange, and, on the other hand, an activation position in which the said cam allows the lock gears 40 to retreat towards a withdrawn position in which their external teeth no longer cooperate with the internal toothing of the movable flange, three metal springs 32 which stress the cam towards its rest position, and a shaft 33 which is linked to the operating lever 5, this shaft extending longitudinally along the axis X and being integral with the cam 31.

Thus, when a user actuates the operating lever 5, thereby turning the cam 31 towards its activation position, the lock gears 40 are free to retreat towards their withdrawn position, which permits the rotation of the movable flange 20, and thus the adjustment of the inclination of the backrest of the seat.

When the user has adjusted the inclination of the backrest, he releases the operating lever 5 in such a way that the cam returns to its rest position under the action of the springs 32, and this brings the lock gears 40 back to their engagement position, which lock gears then block the rotation of the movable flange 20 and of the backrest 3.

According to the invention, each lock gear 40 includes, on the one hand, a head 42 which is relatively wide in an orthoradial direction and which includes the external toothing 41, and, on the other hand, a guide body 43 which is narrower in the orthoradial direction, the cam 31 acting against the end of this guide body.

The widened head 42 is separated from the guide body 43 by two shoulders 44 which are arranged on either side of the lock gear 40 and which are oriented the opposite way from the toothing 41, and it additionally includes on its sides two abutment faces 45 which cooperate with two counter-abutment faces 13 belonging to a widened portion of the guide channel 11 which receives the widened head 42 of the lock gear.

Each abutment face 45 extends parallel to the direction of sliding of the lock gear from the vicinity of the toothing 41 of this lock gear as far as one of the shoulders 44.

When a pivoting torque about the axis X is exerted on the movable flange 20 while the lock gears 40 are in their engagement position, this torque is taken up by the external toothing 41 of the lock gears 40, and it translates into an orthoradial stress on the lock gears.

This orthoradial stress is taken up essentially by the bearing action of one of the abutment faces 45 of each lock gear against the corresponding counter-abutment face 13, the guide bodies 43 not normally being able to take up this orthoradial stress.

In fact, on the one hand, a sufficient lateral play is provided between these guide bodies 43 and the corresponding guide channels 11, and, on the other hand, the guiding length of the guide body 43 in the guide channel 11 is sufficiently limited, considering the lateral play, to permit a certain pivoting of the lock gear 40 about an axis parallel to the axis X when the external toothing 41 of the lock gear is subjected to an orthoradial stress.

Furthermore, the lock gears 40 are made of a harder material than the bosses 12 of the fixed flange 10, or at the very least the abutment faces 45 of the lock gears are harder than the corresponding counter-abutment faces 13.

Figure 5:
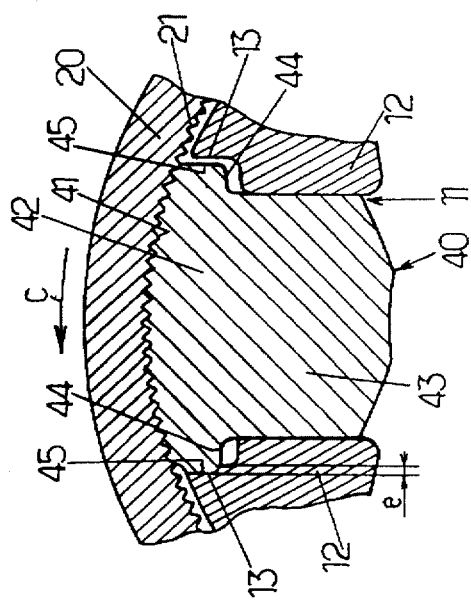
FIG. 5 is a detailed cross-section showing the penetration of one of the abutment faces of one of the lock gears of the articulation in FIG. 2 into one of the counter-abutment faces of the guide which receives this lock gear when a substantial torque is exerted on the movable flange of the articulation.

Thus, as is represented in FIG. 5, when the movable flange 20 is subjected to a pivoting torque C about the axis X which is greater than a predetermined minimum value C0, especially in the event of an accident involving the vehicle in which the seat 1 is installed, one of the abutment faces 45 of each lock gear penetrates into the corresponding counter-abutment face 13.

This penetration takes place over a thickness e which can be greater than 0.2 millimeters for instance, preferably greater than 0.3 millimeters, for example between 0.3 and 0.5 millimeters, without the guidance of the guide body 43 in the corresponding guide channel 11 interfering with this penetration.

In this way, the retreat of the lock gears 40 towards their withdrawn position is prevented by the abutment faces 45 and the corresponding shoulders 44 of the lock gears, which are jammed as a result of their penetration into the corresponding abutment faces 13.

The minimum torque C0 from which one of the abutment faces 45 of each lock gear penetrates into the corresponding counter-abutment face 13 can be, for example, between 50 daN.m and 200 daN.m, or, if appropriate between 100 daN.m and 200 daN.m.

Figure 6:
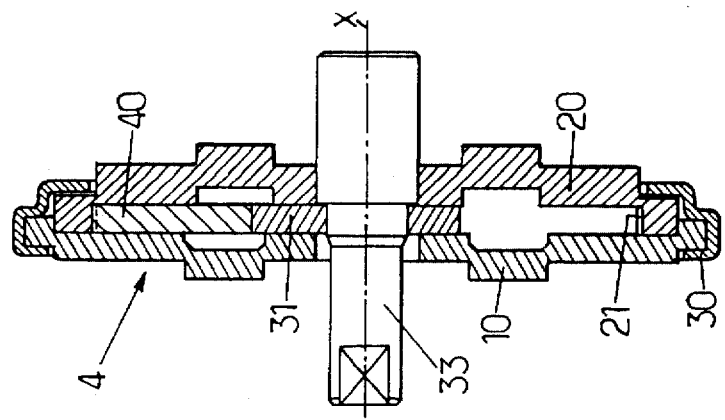
FIG. 6 is a view similar to FIG. 5, of an alternative embodiment of the invention.

Alternatively, as is represented in FIG. 6, the guide 11 could have no narrowing, and the guide body 43 could have two lateral widened areas 43a in the vicinity of the end 43b of the guide body which cooperates with the cam.

In this alternative, the radial guiding of the lock gears 40 is obtained by the cooperation of the abutment surfaces 45 and widened areas 43a with the guides 11.

The alternative in FIG. 6 is otherwise similar to the embodiment in FIGS. 2 to 5, and it functions in the same way.

It will be appreciated that the invention is not limited to the particular embodiments which have just been described; instead, it encompasses all the variants thereof, in particular those in which:

the articulation would include a number of lock gears 40 other than three, and at least equal to one, the articulation would include a number of springs 32 other than three, and at least equal to one, the seat would not include an "seat-mounted" belt 6.

I claim:

1. An articulation for a vehicle seat having a seat part and a backrest pivotable with respect to the seat part, the articulation comprising:

first and second flanges, one of said flanges being joinable to the seat part of the seat, and the other of said flanges being joinable to the backrest of the seat, said flanges being mounted so as to pivot with respect to one another about an axis of rotation, the second flange being integral with a toothing which extends over at least an arc of a circle centered on the axis of rotation, the toothing being oriented radially inward;

at least one lock gear including an external toothing for cooperating with the toothing of the second flange, the lock gear being guided by sliding in a radial direction by a guide integral with the first flange, between an engagement position in which the lock gear cooperates with the toothing of the second flange in order to block the articulation and a withdrawn position in which it does not cooperate with the toothing of the second flange;

a cam for controlling the sliding of the lock gear, the cam being stressed by elastic means toward a rest position wherein the cam places the lock gear in the engagement position;

and a control member for displacing the cam from the rest position toward an activation position in which the cam allows the lock gear to slide toward the withdrawn position, the lock gear having two opposite abutment faces extending from a vicinity of the toothing of the lock gear as far as a shoulder arranged opposite said toothing of the lock gear and situated near the toothing of the lock gear, at least the abutment faces of the lock gear presenting a high mechanical strength, the guide including two counter-abutment faces respectively arranged facing the two abutment faces and the shoulders of the lock gear, the two counter-abutment faces presenting a mechanical strength inferior to strength of the abutment faces, and when the lock gear is in the engagement position, the mutually facing abutment and counter-abutment faces are in mutual contact over a surface area sufficiently small to ensure that one of the abutment faces of the lock gear penetrates into the corresponding counter-abutment face of the guide when one of the flanges is subjected to a pivoting torque, around the axis of rotation, which pivoting torque is greater than a predetermined minimum torque between 50 daN.m and 200 daN.m.

2. The articulation according to claim 1 wherein the predetermined minimum torque is between 100 daN.m and 200 daN.m.

3. The articulation according to claim 1 wherein the lock gear continues in the direction of the cam via a guide body which slides in the guide with a play sufficient to ensure that there is no interference with the penetration of one of the abutment faces of the lock gear into the corresponding counter-abutment face.

4. The articulation according to claim 1 wherein the contact surface between each abutment face and the corresponding counter-abutment face is designed so that when one of the flanges is subjected to a torque at least equal to the predetermined minimum torque while the lock gear is in the engagement position, one of the abutment faces of the lock gear penetrates into the corresponding counter-abutment face to a depth which is at least equal to 0.2 millimeters.

5. The articulation according to claim 4 wherein the depth of penetration of the abutment face into the counter-abutment face is between 0.3 and 0.5 millimeters.

6. A vehicle seat including a seat part and a backrest mounted to pivot with respect to the seat part by means of at least one articulation, the articulation comprising:

first and second flanges, one of said flanges being joinable to the seat part of the seat, and the other of said flanges being joinable to the backrest of the seat, said flanges being mounted so as to pivot with respect to one another about an axis of rotation, the second flange being integral with a toothing which extends over at least an arc of a circle centered on the axis of rotation, the toothing being oriented radially inward;

at least one lock gear including an external toothing for cooperating with the toothing of the second flange, the lock gear being guided by sliding in a radial direction by a guide integral with the first flange, between an engagement position in which the lock gear cooperates with the toothing of the second flange in order to block the articulation and a withdrawn position in which it does not cooperate with the toothing of the second flange;

a cam for controlling the sliding of the lock gear, the cam being stressed by elastic means toward a rest position wherein the cam places the lock gear in the engagement position;

and a control member for displacing the cam from the rest position toward an activation position in which the cam allows the lock gear to slide toward the withdrawn position, the lock gear having two opposite abutment faces extending from a vicinity of the toothing of the lock gear as far as a shoulder arranged opposite said toothing of the lock gear and situated near the toothing of the lock gear, at least the abutment faces of the lock gear presenting a high mechanical strength, the guide including two counter-abutment faces respectively arranged facing the two abutment faces and the shoulders of the lock gear, the two counter-abutment faces presenting a mechanical strength inferior to strength of the abutment faces, and when the lock gear is in the engagement position, the mutually facing abutment and counter-abutment faces are in mutual contact over a surface area sufficiently small to ensure that one of the abutment faces of the lock gear penetrates into the corresponding counter-abutment face of the guide when one of the flanges is subjected to a pivoting torque, around the axis of rotation, which pivoting torque is greater than a predetermined minimum torque between 50 daN.m and 200 daN.m.

7. The vehicle seat according to claim 6 further comprising a seat belt in mechanical connection with the backrest at a site of the backrest remote from the seat part.

8. An articulation for a vehicle seat having a seat part and a backrest pivotable with respect to the seat part, the articulation comprising:

first and second flanges, one of said flanges being joinable to the seat part of the seat, and the other of said flanges being joinable to the backrest of the seat, said flanges being mounted so as to pivot with respect to one another about an axis of rotation, the second flange being integral with a toothing which extends over at least an arc of a circle centered on the axis of rotation, the toothing being oriented radially inward;

at least one lock gear including an external toothing for cooperating with the toothing of the second flange, the lock gear being guided by sliding in a radial direction by a guide integral with the first flange, between an engagement position in which the lock gear cooperates with the toothing of the second flange in order to block the articulation and a withdrawn position in which it does not cooperate with the toothing of the second flange;

a cam for controlling the sliding of the lock gear, the cam being stressed by elastic means toward a rest position wherein the cam places the lock gear in the engagement position;

and a control member for displacing the cam from the rest position toward an activation position in which the cam allows the lock gear to slide toward the withdrawn position, the lock gear having two opposite abutment faces extending from a vicinity of the toothing of the lock gear as far as a shoulder arranged opposite said toothing of the lock gear and situated near the toothing of the lock gear, at least the abutment faces of the lock gear presenting a high mechanical strength, the guide including two counter-abutment faces respectively arranged facing the two abutment faces and the shoulders of the lock gear, the two counter-abutment faces presenting a mechanical strength inferior to strength of the abutment faces, and when the lock gear is in the engagement position, the mutually facing abutment and counter-abutment faces are in mutual contact over a surface area sufficiently small to ensure that one of the abutment faces of the lock gear penetrates into the corresponding counter-abutment face of the guide to a depth which is at least equal to 0.2 millimeters when one of the flanges is subjected to a pivoting torque, around the axis of rotation, which pivoting torque is greater than a predetermined minimum torque.

9. The articulation according to claim 8 wherein the predetermined minimum torque is between 50 daN.m and 200 daN.m.

10. The articulation according to claim 9 wherein the predetermined minimum torque is between 100 daN.m and 200 daN.m.

11. The articulation according to claim 8 wherein the depth of penetration of the abutment face into the counter-abutment face is between 0.3 and 0.5 millimeters.

12. The articulation according to claim 8 wherein the lock gear continues in the direction of the cam via a guide body which slides in the guide with a play sufficient to ensure that there is no interference with the penetration of one of the abutment faces of the lock gear into the corresponding counter-abutment face.

* * * * *